(12) United States Patent
MacLeod (10) Patent No.: US 6,886,171 B2
(45) Date of Patent: Apr. 26, 2005

(54) CACHING FOR I/O VIRTUAL ADDRESS TRANSLATION AND VALIDATION USING DEVICE DRIVERS

(75) Inventor: John MacLeod, Cambridge, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 292 days.

(21) Appl. No.: 09/789,051

(22) Filed: Feb. 20, 2001

(65) Prior Publication Data

US 2002/0166038 A1 Nov. 7, 2002

(51) Int. Cl.[7] .......................... G06F 12/10; G06F 12/00; G06F 12/02; G06F 12/08
(52) U.S. Cl. ...................... 719/324; 719/321; 719/326; 710/3; 710/4; 710/9; 711/1; 711/2; 711/3; 711/200; 711/202; 711/203; 711/205; 711/206; 711/207; 711/208; 711/209; 711/212
(58) Field of Search .............................. 710/2, 3, 4, 9; 711/1, 2, 3, 200, 202, 203, 205, 206–209, 212, 220, 221; 719/321, 324, 326, 327

(56) References Cited

U.S. PATENT DOCUMENTS

| | | | |
|---|---|---|---|
| 3,460,094 A | 8/1969 | Pryor et al. | 340/172.5 |
| 3,544,973 A | 12/1970 | Borck et al. | 340/172.5 |
| 3,548,382 A | 12/1970 | Lichty et al. | 340/172.5 |
| 3,609,704 A | 9/1971 | Shurter | 340/172.5 |
| 3,641,505 A | 2/1972 | Artz et al. | 340/172.5 |
| 3,705,388 A | 12/1972 | Nishimoto | 340/172.5 |
| 3,710,324 A | 1/1973 | Cohen et al. | 340/172.5 |
| 3,736,566 A | 5/1973 | Anderson et al. | 340/172.5 |
| 3,795,901 A | 3/1974 | Boehm et al. | 340/172.5 |
| 3,805,039 A | 4/1974 | Stiffler | 235/153 |
| 3,893,084 A | 7/1975 | Kotok et al. | 340/172.5 |
| 4,164,787 A | 8/1979 | Aranguren | 364/200 |
| 4,228,496 A | 10/1980 | Katzman et al. | 364/200 |

(Continued)

FOREIGN PATENT DOCUMENTS

| | | | | |
|---|---|---|---|---|
| EP | 0 208 430 | | 1/1987 | 13/32 |
| EP | 0 428 330 A3 | | 5/1991 | 13/30 |
| EP | 0 406 759 A3 | | 9/1991 | 12/56 |
| EP | 0 475 005 B1 | | 11/1995 | 15/16 |
| EP | 0 390 567 B1 | | 6/1999 | 29/6 |

OTHER PUBLICATIONS

"Dynamic Scatter Gather Table", Aug., 1990, (pp. 1–2), IBM Technical Disclosure Bulletin.

Primary Examiner—Jeffrey Gaffin
Assistant Examiner—Tanh Q. Nguyen
(74) Attorney, Agent, or Firm—Kirkpatrick & Lockhart Nicholson Graham LLP (57) ABSTRACT

A method and apparatus for input/output virtual address translation and validation assigns a range of memory to a device driver for its exclusive use. The device driver invokes system functionality for receiving a logical address and outputting a physical address having a length greater than the logical address. Another feature of the invention is a computer system providing input/output virtual address translation and validation for at least one peripheral device. In one embodiment, the computer system includes a scatter-gather table, an input/output virtual address cache memory associated with at least one peripheral device, and at least one device driver. In a further embodiment, the input/output virtual address cache memory includes an address validation cache and an address translation cache.

25 Claims, 6 Drawing Sheets

U.S. PATENT DOCUMENTS

| | | | |
|---|---|---|---|
| 4,356,550 A | 10/1982 | Katzman et al. | 364/200 |
| 4,365,295 A | 12/1982 | Katzman et al. | 364/200 |
| 4,366,535 A | 12/1982 | Cedolin et al. | 364/200 |
| 4,466,098 A | 8/1984 | Southard | 371/9 |
| 4,484,273 A | 11/1984 | Stiffler et al. | 364/200 |
| 4,695,975 A | 9/1987 | Bedrij | 364/900 |
| 4,700,292 A | 10/1987 | Campanini | 364/200 |
| 4,716,523 A | 12/1987 | Burrus, Jr. et al. | 364/200 |
| 4,866,604 A | 9/1989 | Reid | 364/200 |
| 4,924,427 A | 5/1990 | Savage et al. | 364/900 |
| 4,942,517 A | 7/1990 | Cok | 364/200 |
| 4,942,519 A | 7/1990 | Nakayama | 364/200 |
| 4,965,717 A | 10/1990 | Cutts, Jr. et al. | 364/200 |
| 4,993,030 A | 2/1991 | Krakauer et al. | 371/40.1 |
| 5,115,490 A | 5/1992 | Komuro et al. | 395/400 |
| 5,175,855 A | 12/1992 | Putnam et al. | 395/700 |
| 5,193,162 A | 3/1993 | Bordsen et al. | 395/425 |
| 5,193,180 A | 3/1993 | Hastings | 395/575 |
| 5,195,040 A | 3/1993 | Goldsmith | 364/443 |
| 5,231,640 A | 7/1993 | Hanson et al. | 371/68.3 |
| 5,276,860 A | 1/1994 | Fortier et al. | 395/575 |
| 5,280,612 A | 1/1994 | Lorie et al. | 395/600 |
| 5,280,619 A | 1/1994 | Wang | 395/725 |
| 5,295,258 A | 3/1994 | Jewett et al. | 395/575 |
| 5,317,726 A | 5/1994 | Horst | 395/575 |
| 5,321,706 A | 6/1994 | Holm et al. | 371/51.1 |
| 5,335,334 A | 8/1994 | Takahashi et al. | 395/425 |
| 5,357,612 A | 10/1994 | Alaiwan | 395/200 |
| 5,386,524 A | 1/1995 | Lary et al. | 395/400 |
| 5,404,361 A | 4/1995 | Casorso et al. | 371/40.1 |
| 5,423,037 A | 6/1995 | Hvasshovd | 395/600 |
| 5,423,046 A | 6/1995 | Nunnelley et al. | 395/750 |
| 5,426,747 A | 6/1995 | Weinreb et al. | 395/400 |
| 5,440,727 A | 8/1995 | Bhide et al. | 395/444 |
| 5,440,732 A | 8/1995 | Lomet et al. | 395/600 |
| 5,463,755 A | 10/1995 | Dumarot et al. | 395/475 |
| 5,475,860 A | 12/1995 | Ellison et al. | 395/846 |
| 5,497,476 A | 3/1996 | Oldfield et al. | 395/439 |
| 5,504,873 A | 4/1996 | Martin et al. | 395/438 |
| 5,513,314 A | 4/1996 | Kandasamy et al. | 395/182.04 |
| 5,550,986 A | 8/1996 | DuLac | 395/280 |
| 5,555,404 A | 9/1996 | Torbjçrnsen et al. | 395/600 |
| 5,557,770 A | 9/1996 | Bhide et al. | 295/488 |
| 5,566,316 A | 10/1996 | Fechner et al. | 395/441 |
| 5,568,629 A | 10/1996 | Gentry et al. | 395/441 |
| 5,584,008 A | 12/1996 | Shimada et al. | 395/441 |
| 5,584,018 A | 12/1996 | Kamiyama | 395/492 |
| 5,586,253 A | 12/1996 | Green et al. | 395/411 |
| 5,586,310 A | 12/1996 | Sharman | 395/600 |
| 5,627,961 A | 5/1997 | Sharman | 395/182.04 |
| 5,632,031 A | 5/1997 | Velissaropoulos et al. | 395/611 |
| 5,664,172 A | 9/1997 | Antoshenkov | 395/604 |
| 5,671,442 A * | 9/1997 | Feeney et al. | 710/14 |
| 5,687,392 A | 11/1997 | Radko | 395/842 |
| 5,815,649 A | 9/1998 | Utter et al. | 395/112.04 |
| 5,838,899 A | 11/1998 | Leavitt et al. | 395/185.09 |
| 5,862,145 A | 1/1999 | Grossman et al. | 371/5.1 |
| 5,892,928 A | 4/1999 | Wallach et al. | 395/283 |
| 5,894,560 A | 4/1999 | Carmichael et al. | 395/845 |
| 5,953,538 A | 9/1999 | Duncan et al. | 395/842 |
| 5,953,742 A | 9/1999 | Williams | 711/154 |
| 5,956,756 A | 9/1999 | Khalidi et al. | 711/207 |
| 5,990,914 A | 11/1999 | Horan et al. | 345/521 |
| 6,012,106 A | 1/2000 | Schumann et al. | 710/22 |
| 6,012,120 A | 1/2000 | Duncan et al. | 710/22 |
| 6,021,456 A | 2/2000 | Herdeg et al. | 710/260 |
| 6,047,343 A | 4/2000 | Olarig | 710/102 |
| 6,098,137 A | 8/2000 | Goodrum et al. | 710/129 |
| 6,105,075 A | 8/2000 | Ghaffari | 710/5 |
| 6,128,711 A | 10/2000 | Duncan et al. | 711/155 |
| 6,138,198 A | 10/2000 | Garnett et al. | 710/129 |
| 6,141,722 A | 10/2000 | Parsons | 711/2 |
| 6,141,744 A | 10/2000 | Wing So | 712/35 |
| 6,202,147 B1 * | 3/2001 | Slaughter et al. | 713/1 |
| 6,484,227 B1 * | 11/2002 | Mergard et al. | 711/1 |
| 6,546,483 B1 * | 4/2003 | Lai | 713/1 |

\* cited by examiner

CACHING FOR I/O VIRTUAL ADDRESS TRANSLATION AND VALIDATION USING DEVICE DRIVERS

FIELD OF THE INVENTION

The present invention relates to the field of computer systems. More specifically, the present invention relates to the translation and validation of a logical address to a physical address in a computer system.

BACKGROUND OF THE INVENTION

Computer systems usually include a motherboard containing a central processing unit (CPU) and a memory. Typically, one or more external devices (i.e., peripheral devices) are in communication with the computer system and can access (i.e., read and/or write to) the memory. A peripheral device in communication with the motherboard may attempt to access a memory location that is either nonexistent or prohibited by the CPU. For example, if the peripheral device writes to a particular memory location that is specifically used by the CPU for a specific function, the CPU may not be able to operate correctly following the write to that particular memory location. Therefore, it would be advantageous to intercept such an attempt to access a memory location that is unavailable to a peripheral device and thereby provide a level of fault-tolerance.

SUMMARY OF THE INVENTION

The present invention provides a method and apparatus for input/output (I/O) virtual address translation and validation. In one aspect, a range of memory in a computer system is assigned to a device driver for its exclusive use. The device driver is associated with a peripheral device attached to a bus. The device driver invokes system functionality of the computer system for receiving a logical address and outputting a physical address. In one embodiment, the physical address has a length that is greater than the logical address.

In one embodiment, the device driver assigns a bus slot number to the peripheral device. In another embodiment, the I/O virtual address translation is disabled. In yet another embodiment, the device driver assigns a range of memory to at least one attached peripheral device. In a further embodiment, memory is allocated for a scatter-gather table.

In another aspect, the invention relates to an apparatus for providing I/O virtual address translation and validation. The apparatus includes a peripheral device and a memory. Additionally, the apparatus includes an I/O virtual address cache memory, a scatter-gather table, and a device driver. The scatter-gather table is in communication with the I/O virtual address cache memory and maps a logical address to a physical address. The logical address is associated with the peripheral device and has a length that is less than the physical address. The device driver provides the logical address to the I/O virtual address cache memory to obtain the physical address.

In one embodiment, the I/O virtual address cache memory includes an address validation cache and an address translation cache. The address validation cache corroborates that an address is a valid address within a range of addresses. The address translation cache translates the address from a logical address to a physical address.

BRIEF DESCRIPTION OF THE DRAWINGS

These and other advantages of the invention may be more clearly understood with reference to the specification and the drawings, in which.

In the drawings, like reference characters generally refer to the same parts throughout the different views. Also, the drawings are not necessarily to scale, emphasis instead being placed upon illustrating the principles of the invention.

DETAILED DESCRIPTION OF THE INVENTION

Figure 1:
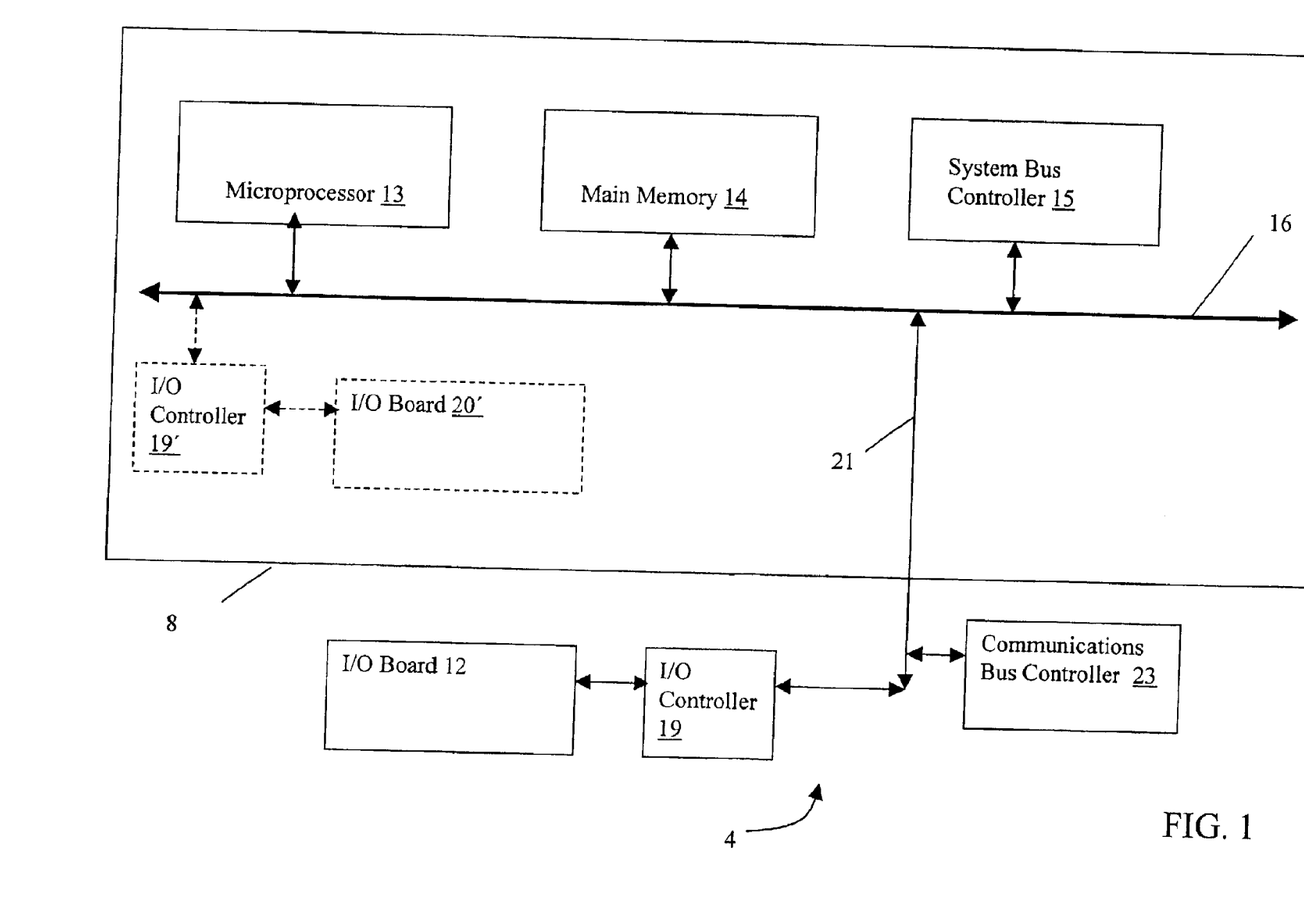
FIG. 1 is a block diagram of an embodiment of a computer system constructed in accordance with the invention.

A computer system 4 constructed in accordance with the invention is depicted in FIG. 1. In brief overview, the computer system 4 includes a motherboard 8 in communication with an I/O board 12. The motherboard 8 includes a microprocessor 13, a main memory 14 for storing programs and/or data, a system bus controller 15, and a system bus 16 allowing communication among these components. Examples of the microprocessor 13 are, without limitation, a Pentium Classic/MMX CPU, developed by Intel Corporation of Austin, Tex., an AMD-K6 CPU, developed by AMD of Sunnyvale, Calif., and the like. The system bus controller 15 determines which component (e.g., microprocessor 13) obtains control of the system bus 16. In one embodiment, the system bus controller 15 polls an interrupt line (not shown) and grants access to the system bus 16 to the component associated with the interrupt having the highest priority.

The motherboard 8 and the I/O board 12 are additionally in communication with an I/O controller 19. In one embodiment, the I/O controller 19 is also in communication with the system bus 16 (and therefore in communication with the motherboard 8) via a communications bus 21. In a further embodiment, a communications bus controller 23 determines which component (e.g., I/O controller 19) obtains control of the communications bus 21. In another embodiment, an internal I/O controller 19' is connected directly to the system bus 16 and an internal I/O board 20' (i.e., the I/O board 20' is part of the motherboard 8).

In one particular embodiment, the communications bus 21 is a Peripheral Component Interconnect (PCI) bus, developed by Intel Corporation of Austin, Tex., and which is a local bus used for interfacing a peripheral device with the computer system 4. Other examples of the communications bus 21 include, without limitation, an Industry Standard Architecture (ISA) bus, an Extended ISA (EISA) bus, a Nu Bus developed by Apple of Cupertino, Calif., a MicroChannel Architecture (MCA) Bus developed by IBM Corporation of Armonk, N.Y., a Video Electronics Standards Association (VESA) bus, a VESA local (VL) bus, and the like.

In one embodiment, the system bus 16 and/or the communications bus 21 includes a predefined number of slots (i.e., bus slots). Any peripheral device in communication with the bus 16, 21 is connected to a bus slot. In other embodiments, each bus slot has a control line so that the bus controller 15, 23 can enable and disable access to the respective bus 16, 21 (e.g., for a particular peripheral device). In yet another embodiment, each bus controller 15, 23 has a separate enable register for each bus slot. Further, each bus slot has a range of memory located in the main memory 14 associated with the bus slot (and therefore associated with a peripheral device connected to that bus slot).

Figure 2:
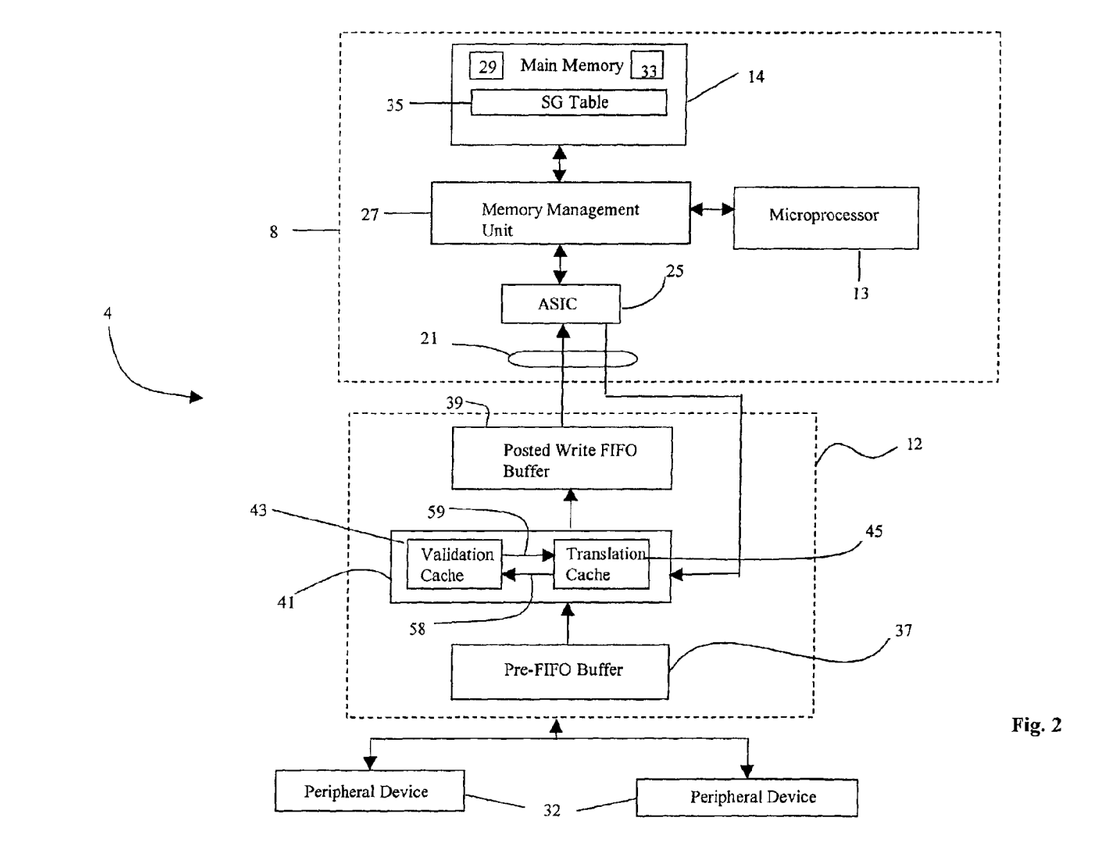
FIG. 2 is a more detailed block diagram of the computer system of FIG. 1.

In more detail and also referring to FIG. 2, the motherboard 8 includes an Application Specific Integrated Circuit (ASIC) 25 in communication with a memory management unit (MMU) 27. The MMU 27 is also in communication with the microprocessor 13 and the main memory 14 over the system bus 16.

The main memory 14 typically includes a volatile memory component 29 and a non-volatile memory component 33. Examples of the volatile memory component 29 include, without limitation, Random Access Memory (RAM), Static RAM (SRAM), and Dynamic RAM (DRAM). Examples of the non-volatile memory component 33 include, without limitation, Read Only Memory (ROM), Programmable ROM (PROM), Erasable Programmable ROM (EPROM), and the like.

The volatile memory component (hereafter referred to as "RAM") 29 typically contains an operating system (not shown) and one or more device drivers (not shown) that permit access to various peripheral devices 32 (e.g., a display screen, a keyboard, a disk drive, a printer). Examples of the OS include, but are not limited to, Windows NT developed by Microsoft Corporation of Redmond, Wash., OS/2 developed by IBM Corporation of Armonk, N.Y., Netware developed by Novell, Incorporated of San Jose, Calif., and the like. The non-volatile memory component (hereafter referred to as "ROM") 33 typically contains a basic input/output system (BIOS) (not shown) that handles the boot process of the computer system 4.

Additionally, the MMU 27 maintains a scatter-gather (S/G) table 35 stored in the main memory 14. The S/G table 35 is a table that contains information mapping one memory address to another memory address for the peripheral devices 32.

The I/O board 12 includes a first buffer 37 (hereafter referred to as a "pre-FIFO buffer") and a second buffer 39 (hereafter referred to as a "posted write FIFO buffer") arranged in a first-in, first-out (FIFO) manner (i.e., the current data read out of the buffer 37, 39 was the oldest data written into the buffer 37, 39). The I/O board 12 also includes an I/O virtual address (IOVA) cache memory 41. In another embodiment, the IOVA cache memory 41 is cache memory that is not located on the I/O board 12. In yet another embodiment, the IOVA cache memory 41 is a disk cache. Similar to the motherboard 8, the I/O board 12 may additionally include an ASIC.

In general, the IOVA cache memory 41 prevents a prohibited access of the main memory 14 by a peripheral device 32, thus avoiding the shortcomings of the prior art. In more detail, the IOVA cache memory 41 provides a virtual memory space having IOVA addresses for mapping and checking read requests and write requests by the peripheral device 32 to the motherboard 8 (i.e., to main memory 14) over the communications bus 21. Furthermore, the IOVA cache memory 41 can be a directly mapped memory, a fully associative memory, or a set associative memory. Other organizations of the cache memory are additionally possible without affecting the operation of the present invention.

Additionally and as described in more detail below, the pre-FIFO buffer 37 stores data that has not yet been transmitted to the IOVA cache memory 41. The posted write FIFO buffer 39 stores data after the data has been transmitted to the IOVA cache memory 41 (i.e., after translation and validation, as described below) but prior to transmitting the data to the main memory 14.

More specifically, the IOVA cache memory 41 includes a validation cache 43 and a translation cache 45. As described further below, the validation cache 43 corroborates that a logical address is a valid address within the range of addresses corresponding to the main memory 14. The translation cache 45 translates a logical address (i.e., an address having a communications bus address format) to the main memory address format, or physical address, that the motherboard 8 can read from or write to. In one embodiment, addresses on the communications bus 21 (i.e., logical addresses) have a 32 bit address format and the main memory addresses (i.e., physical addresses) have a 36 bit address format. Therefore, the translation cache 45 enables 32-bit bus controllers (i.e., bus controller 23) to directly address the main memory 14 above a certain memory limit that otherwise exists due to the size (i.e., 32 bit) of addresses on the communications bus 21.

In one embodiment, an entry stored in the IOVA cache memory 41 at an IOVA address includes an identifying field (hereafter "tag bits"). The I/O board 12 constructs the tag bits from a predetermined portion of the logical address (from the requesting peripheral device 32). When updating (e.g., writing) a cache entry in the IOVA cache memory 41, the I/O board 12 inserts the tag bits as part of the IOVA cache memory entry. When reading a cache entry in the IOVA cache memory 41, the I/O board 12 compares the tag bits of the IOVA cache memory entry to the predetermined portion of the logical address.

In other embodiments, the IOVA cache memory entry includes a bus slot number. The bus slot number stored in the IOVA cache memory entry indicates which, if any, peripheral devices 32 have access to the IOVA cache memory entry associated with the logical address.

The invention is particularly useful in a system-critical fault-tolerant computer (FTC) system 4 that offers continuous availability. In such an embodiment, the invention may include multiple motherboards 8, multiple I/O boards 12, and the associated multiple components shown in FIG. 1, such as multiple microprocessors 13. In a FTC system 4, each motherboard 8 operates in a synchronous, lock-step manner (i.e., each microprocessor 13 performs the same instructions at substantially the same time and on the same clock cycle). In a FTC system 4, the invention provides additional fault-tolerant functionality by protecting the main memory 14 from invalid access by peripheral devices 32.

Figure 3A:
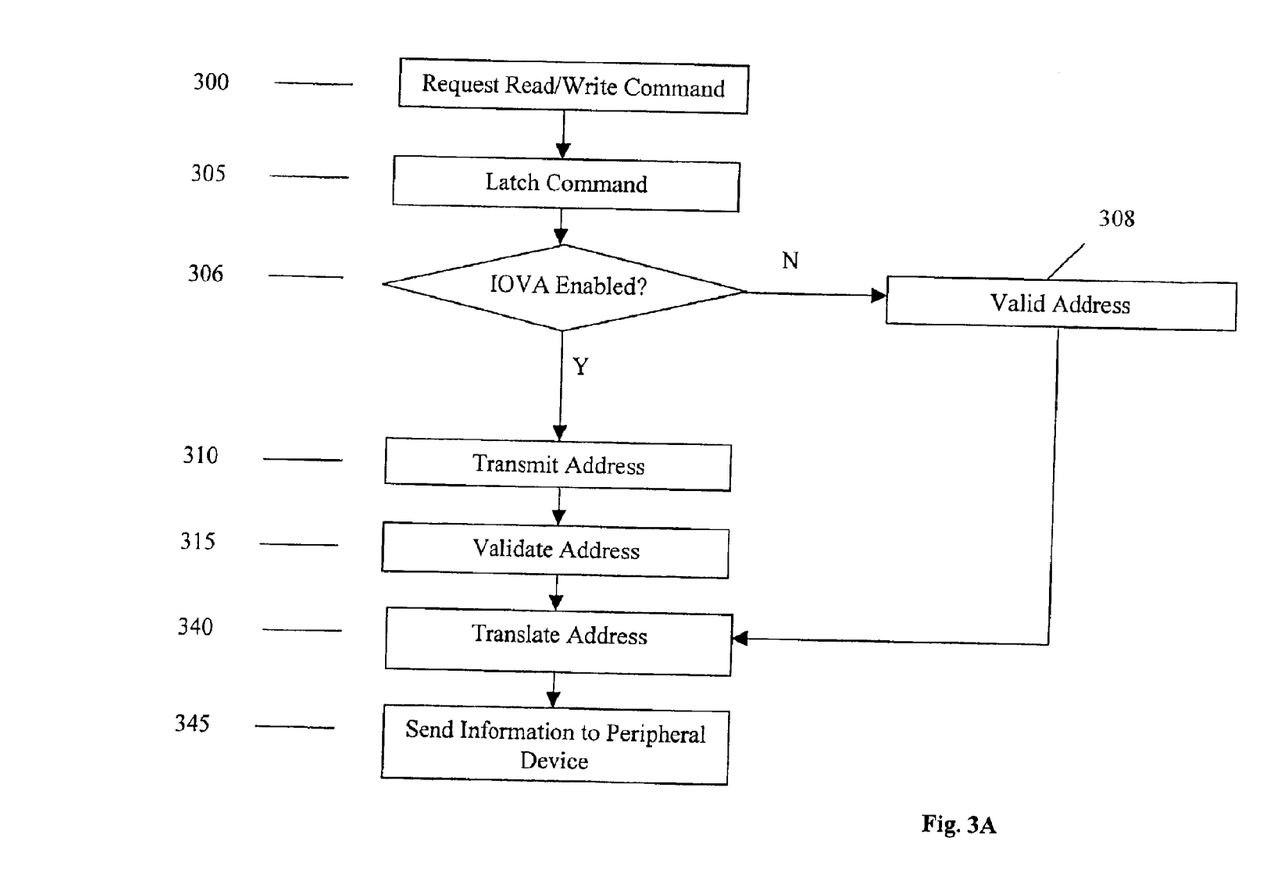
FIG. 3A is a flow diagram illustrating an embodiment of the operation of the computer system of FIG. 1 having an input/output virtual address cache.

Also referring to FIG. 3A, a flow diagram depicting an embodiment of the operation of the computer system 4 is shown. A peripheral device 32 requests (step 300) a read or a write command. The pre-FIFO buffer 37 temporarily stores any read/write (R/W) commands from the peripheral devices 32. The R/W command is then latched (step 305) into the translation cache 45. The computer system 4 then determines (step 306) if the IOVA cache memory 41 is enabled to perform the address translation and validation. If the IOVA cache memory 41 is not enabled, the address is deemed to be (step 308) valid. If the IOVA cache memory 41 is enabled, the translation cache 45 transmits (step 310) the logical address 58 associated with the R/W command to the validation cache 43 and the validation cache 43 validates (step 315) the address 58. The validation cache 43 then transmits the address 58 to the translation cache 45 as address 59. The translation cache 45 then translates (step 340) the address 59 to a physical address.

After verification and translation, the pre-FIFO buffer 37 releases the R/W command to the posted write FIFO buffer 39. The I/O board 12 then transmits the command to the ASIC 25, and the ASIC 25 transmits the R/W command to the MMU 27. The MMU 27 determines the physical address stored in the S/G table 35 associated with the R/W command and sends (step 345) the requested information back to the requesting peripheral device 32.

Figure 3B:
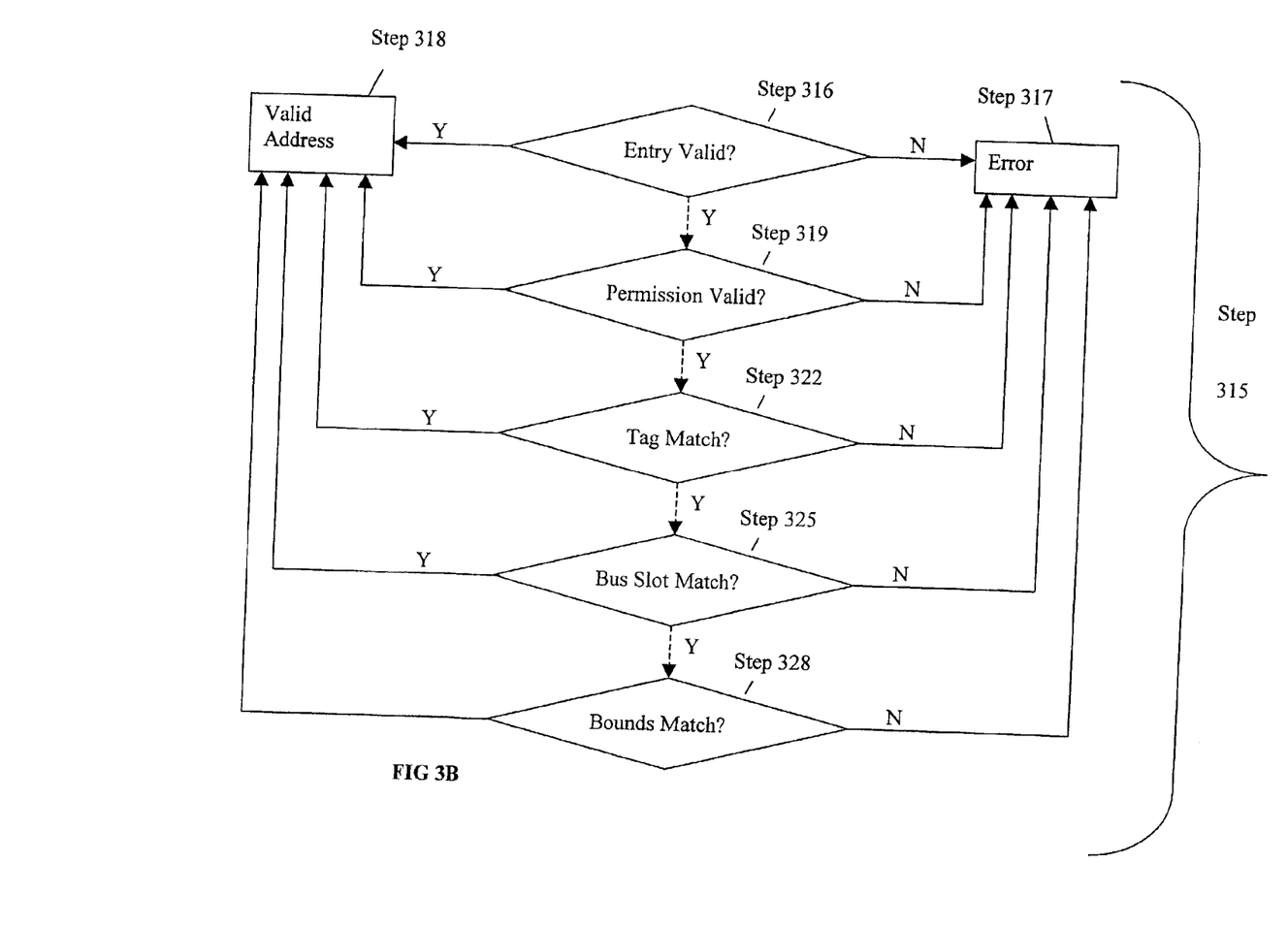
FIG. 3B is a flow diagram illustrating an embodiment of the operation of the computer system of FIG. 1 to validate an address.

More specifically and also referring to FIG. 3B, the validation cache 43 checks whether the address 58 is an address within the main memory 14 to validate (step 315) the address 58. In one embodiment, the validation cache 43 performs one or more of the following checks: 1) validity check, 2) permission verification, 3) tag compare, 4) bus slot compare, and 5) bounds compare.

In general, a validity check is a determination of whether the address 58 is an address that can be read by the IOVA cache memory 41. For example, an address 58 is invalid if the address 58 has an incorrect size. The permission verification is a test to determine whether the read and write command can occur for the type of transaction that the peripheral device 32 is performing. A bounds compare determines whether an address 58 is within a particular memory range (e.g., within the memory 14).

In greater detail and in one embodiment, the validation cache 43 performs a cache validity check on the IOVA cache memory entry (associated with the address 58) stored in the IOVA cache memory 41 and determines (step 316) if the cache entry is valid. In one embodiment, the validation cache 43 performs the cache validity check when a predetermined bit in a predefined register is set. In another embodiment, the determination is set during initialization of the computer system 4. More specifically and in one embodiment, if the validation cache 43 determines that a predetermined bit is inactive in the IOVA cache memory entry, the S/G table 35 entry is invalid, resulting in a cache miss and a subsequent update from the main memory 14. An invalid entry error occurs (step 317) if the IOVA cache memory entry is invalid following the update from the main memory 14. If the entry is valid, the validation cache 43 deems (step 318) the address as a valid address.

The validation cache 43 can also perform a permission verification on the address 58. In one embodiment, the validation cache 43 performs the permission verification following the cache validity check. The validation cache determines (step 319) if the permission is valid. The validation cache 43 makes the determination by verifying that the read or write command can occur for the type of transaction the peripheral device 32 is performing. If the read or write command is invalid, an error results (step 321). If the permission is valid, the validation cache 43 deems (step 318) the address as a valid address.

The validation cache 43 can also perform a tag compare. The validation cache 43 determines (step 322) if the tag bits, as described above, in the IOVA cache memory entry are equivalent to a predetermined portion of the address 58. The tag bits can be any portion of the IOVA cache memory entry. More specifically, in some embodiments, the tag bits are the upper two bits or the lower two bits of the IOVA cache memory entry. In other embodiments, the tag bits are the upper four bits or the lower four bits of the IOVA cache memory entry. In more preferred embodiments, the tag bits are the upper eight bits or the lower eight bits of the IOVA cache memory entry. In yet other embodiments, the tag bits are the upper sixteen bits or the lower sixteen bits of the IOVA cache memory entry. It should be clear that the tag bits of the IOVA cache memory entry can be any portion of the number of bits in the IOVA cache memory entry. Similarly, the predetermined portion of the address 58 can be any portion of the address 58 (e.g., the low order bits, the high order bits).

If the tag bits match, the validation cache 43 deems (step 318) the address as a valid address. An error occurs (step 317) if the tag bits do not match the predetermined portion of the address 58.

In one embodiment, the validation cache 43 additionally determines (step 325) if the bus slot number included in the IOVA cache memory entry matches the bus slot number assigned to the peripheral device 32 requesting the read or write. If the bus slot numbers match, the validation cache 43 deems (step 318) the address as a valid address. A disparity between the bus slot number assigned to the peripheral device 32 to the bus slot number stored in the IOVA cache memory entry results (step 317) in an error.

Further, the validation cache 43 can also perform a bounds compare. The validation cache 43 determines (step 328) whether the size boundary of the address 58 is equivalent to the bounds specified by the starting and ending boundaries of the memory region addressed by the IOVA cache memory entry. If the size boundary of the address 58 does not match the bounds specified, an error results (step 317). If the size boundary matches the bounds specified, the address 58 is deemed to be valid (step 318). It should be noted that the validation cache 43 can perform any one or any combination of the above mentioned checks to validate the address 58.

Referring again to FIG. 1, during a normal boot operation the computer system 4 typically invokes a BIOS (not shown) that typically provides low-level access to the peripheral devices 32; identifies RAM 29 available to the microprocessor 13; initializes this RAM 29, typically destroying its contents; and then installs the operating system into the RAM 29, giving the operating system access to the entire RAM 29 to move information into and out of memory as necessary. If the computer system 4 is started after having been powered down, all of its memory will have been initialized.

Figure 4:
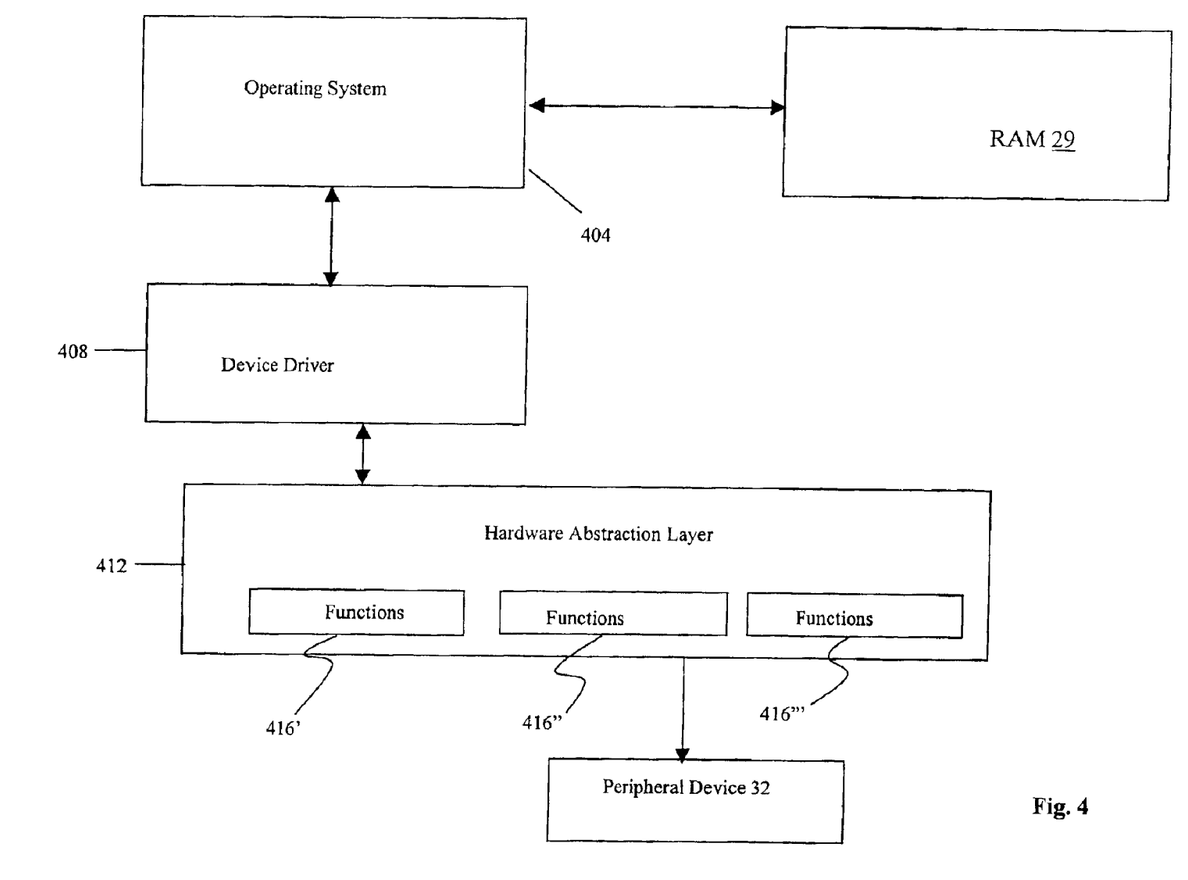
FIG. 4 is a high-level functional block diagram of an embodiment of system configuration software layers of the computer system of FIG. 1.

Referring to FIG. 4, a high-level functional block diagram of the configuration software layers of the computer system 4 is shown. The software layers include an operating system 404 in communication with a device driver 408. In one embodiment, the device driver 408 manages and controls the peripheral devices 32.

In one embodiment, the device driver 408 communicates with a hardware abstraction layer (HAL) 312, which is essentially an interface between the device driver 408 and the peripheral devices 32. In one embodiment, the HAL 412 enables the operating system 404 to send commands to the peripheral device 32 without determining specific details about the peripheral device 32. For example, the operating system 404 can send a generic command, such as "read from peripheral device 32" to the HAL 412 without identifying the specific details (e.g., specific command to read that particular peripheral device 32). The HAL 412 typically contains many functions 416', 416", 416''' (generally 416) associated with the peripheral devices 32.

A table of one embodiment of the HAL functions 416 available, the input parameters of these HAL functions 416, and the output parameters of these HAL functions 416 is shown in the Appendix. For example, the HALEnableIOVA function enables the IOVA cache memory 41 to perform the address verification and translation for a particular address. In one embodiment, if this function 416 is not called (i.e., the IOVA cache memory 41 is disabled), the peripheral device 32 cannot write to the requested address 58. In another embodiment, if this function 416 is not called (i.e., the IOVA cache memory 41 is disabled), the peripheral device 32 can write to any location in the main memory 14 (i.e., no checking or validation performed by the IOVA cache memory 41).

As another example, the HALMapCommonBuffer function 416 maps a range of contiguous physical memory (i.e., having physical addresses) to enable access by a bus master device. The function 416 returns a logical address corresponding to the physical address if the physical address can be mapped. The HAL functions 416, input parameters, and output parameters illustrated in the Appendix are merely illustrative and not limiting to the invention.

Figure 5:
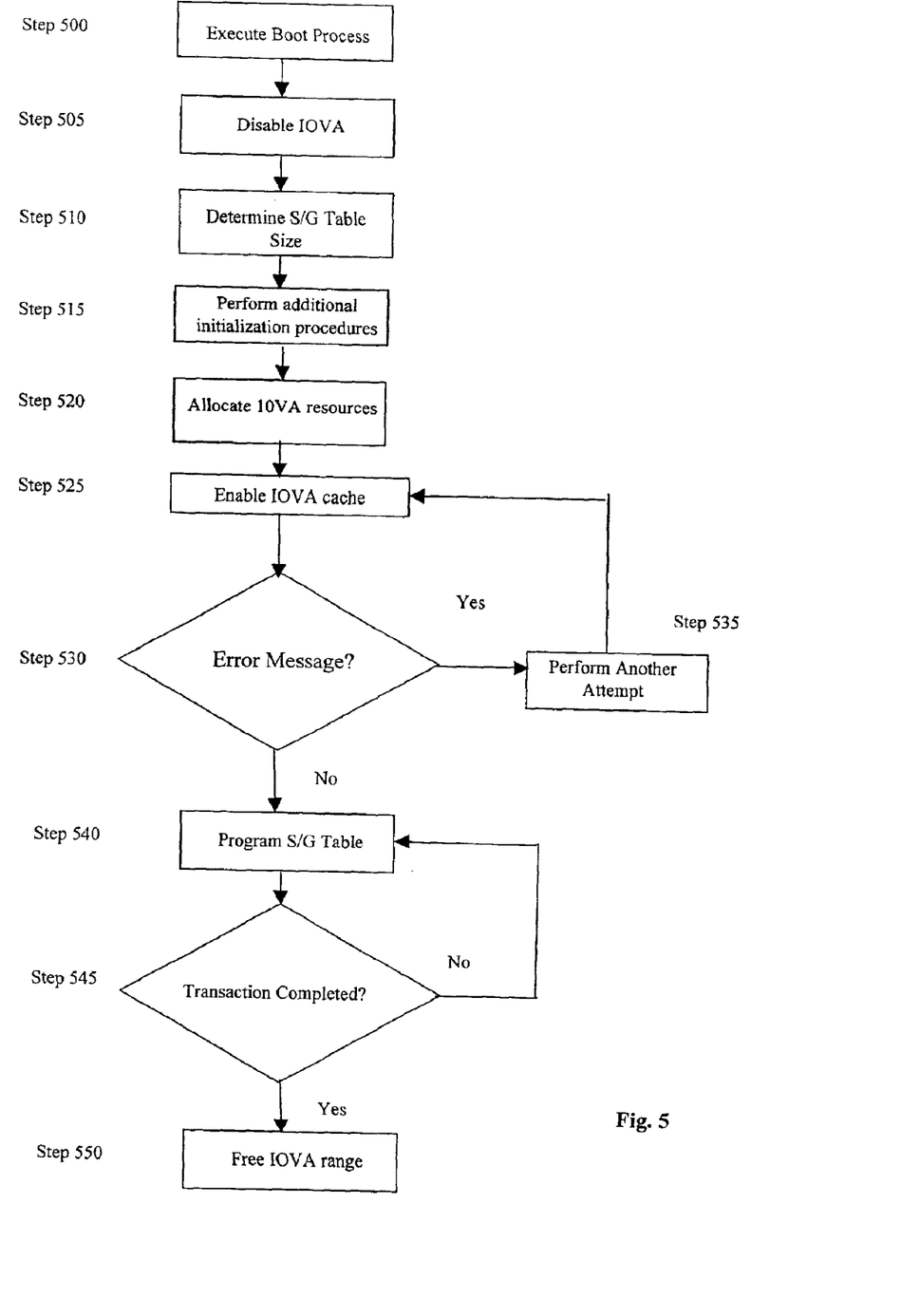
FIG. 5 is a flow diagram illustrating an embodiment of the steps performed by a device driver to manage input/output virtual address functionality.

Referring also to FIG. 5, a flow diagram is shown denoting the steps that the device driver 408 performs to manage the IOVA functionality. The BIOS first initializes the computer system 4 by executing (step 500) a boot process. In one embodiment, the boot process includes the operating system 404 initializing or modifying the RAM 29 during a boot cycle. Additionally, on a "cold" boot (i.e., the startup of the computer system 4 from a powered down state) or following a "reboot" of the computer system 4, the BIOS disables (step 505) the IOVA cache memory 41 to program the I/O board 12 to enumerate the communications bus 21, or identify all of the peripheral devices 32 attached to the communications bus 21 and initialize the required routines (e.g., drivers) that enable the peripheral devices 32 to function. In an embodiment in which the communications bus 21 is a PCI bus, the BIOS may program configuration space registers for sparse PCI enumeration.

The HAL 412 then determines (step 510) a size for the S/G memory table 35. In one embodiment, the S/G memory table 35 supports a programmable table size through the programming of a register. Therefore, the operating system 404 can minimize the S/G table 35 size in a low end system (e.g., the size of the main memory 14 is less than a predefined memory size) and can map the entire range of logical addresses in a high end system (e.g., the size of the main memory 14 is greater than the size of the range of available logical addresses). In one embodiment, the HAL 412 obtains a table size parameter from an initialization file (e.g., boot.ini) and uses the size to determine the amount of memory to allocate. If no table size parameter is found, the HAL 412 uses a default table size parameter to determine the table size. In a further embodiment, the HAL 412 allocates a minimum amount of memory for the S/G memory table 35. For example, the HAL 412 calls a HAL function 416 (e.g., HalAllocatePhysicalMemory) to allocate the S/G table 35.

Additionally, the HAL 412 can assign a predetermined start address for the S/G table 35. In one embodiment, if the computer system 4 does not have enough memory space available within the main memory 14, the HAL function 416 (e.g., HalAllocatePhysicalMemory) returns an error (e.g., No$_{31}$ Memory error). In another embodiment, the computer system 4 frees memory space that has not been modified in a predefined amount of time to enable the allocation of the S/G table 35. In one embodiment, the HAL 412 then performs (step 515) additional initialization procedures, such as, but not limited to, the determination of the size of the main memory 14, the verification of a valid I/O board 12, the verification of a valid motherboard 8, and the like.

In greater detail and in one embodiment, the HAL 412 determines its "registry parameters." In one embodiment in which the operating system 404 is the Microsoft Windows operating system, the HAL 412 reads the registry parameters from the Microsoft Windows 2000 registry file. In another embodiment, the HAL 412 reads the registry parameters from a file stored on the computer system 4. In yet another embodiment, the HAL 412 reads the registry parameters from the main memory 14. The registry parameters can be further divided into a bus enumeration, also referred to hereafter as a PCI Bus Enumeration, which provides a location for bus (e.g., PCI) enumeration parameters, and a bus configuration space, also referred to hereafter as a PCI Configuration Space, which provides a location for parameters that can override the default parameters in the bus enumeration (e.g., PCI Bus Enumeration) parameters. For example, "registry parameters" within the PCI Configuration Space are a PCI bus number and a PCI slot number. Additionally, examples of "registry parameters" within the PCI Bus Enumeration include, but are not limited to, memory size allocated to the I/O board 12, amount of I/O space allocated to the I/O board 12, range of bus numbers allocated to the I/O board 12, and the like.

The HAL 412 then allocates (step 520) resources from the RAM 29 for the IOVA cache memory 41 and the PCI Configuration Space. Additionally, the device driver 408 stores any errors that occur throughout the process. In one embodiment, the device driver 408 calls a HAL function 416 (e.g., HalGetSlotData) to obtain various error and state data, including HAL initialization errors.

Then the device driver 408 invokes computer system functionality to enable (step 525) the IOVA cache memory 41. In one embodiment, the device driver 408 calls a HAL function 416 (e.g., HalEnableIOVA) to enable the IOVA cache memory 41. In other embodiments, the HAL 412 enables the IOVA cache memory 41 by writing a predefined value to a predetermined register associated with the IOVA cache memory 41. In yet another embodiment, the HAL 412 enables the IOVA cache memory 41 by writing any value to a predetermined register associated with the IOVA cache memory 41. In another embodiment, the HAL 412 enables the IOVA cache memory 41 by writing a value (e.g., predefined, any value) to the IOVA cache memory 41.

Further, the HAL 412 maintains a reference count of peripheral devices 32 using the IOVA cache memory 41 for each bus slot on the I/O board 12. In one embodiment, the device driver 408 includes multiple peripheral devices 32 that share the same bus slot. In other embodiments, these peripheral devices 32 occupy different bus function addresses or may be located under secondary bus bridges (e.g., a secondary PCI bridge).

Additionally, if an unsupported I/O board 12 is detected, the HAL function 416 (e.g., HalEnableIova) that the device driver 408 invoked returns an error code. In one embodiment, the device driver 408 then operates without the IOVA cache memory 41. In another embodiment, the device driver 408 halts operations.

Once the device driver 408 enables the IOVA cache memory 41, the device driver 408 can map and free IOVA ranges by invoking distinct HAL functions 416. For example, a device driver 408 provides a physical address that does not vary frequently (i.e., a long-term physical address), such as for queues and device control structures, to a HAL function 416 (e.g., HalMapCommonBuffer) and the HAL function 416 returns a logical address corresponding to the physical address. Additionally, a device driver 408 provides a physical address for an upcoming use (i.e., a short-term physical address), such as addresses for data destination buffers, to a HAL function 416 (e.g., HalMapIovaRange) and the HAL function 416 returns a logical address corresponding to the physical address.

If any of the above mentioned HAL functions 416 returns (step 530) an error message (e.g., No_IOVA), the device driver 408 delays the execution of the HAL function 416 and performs (step 535) another attempt at a later time. In one embodiment, the device driver 408 executes a delay mechanism to perform this request at the later time. In additional embodiments, the device driver 408 calls a HAL function 416 (e.g., HALDisableIOVA) to disable the IOVA cache memory 41.

Following a successful allocation of IOVA addresses in step 520, the device driver 408 invokes another HAL function 416 (e.g., HalMapIovaRange) to program (step 540) the S/G table 35 for the I/O board 12. The device driver 408 invokes the HAL function 416 for each memory range (consisting of physical addresses) that the peripheral device 32 uses for its operation. The HAL function 416 outputs a logical address (e.g., an IOVA address) to the device driver 408 for use by the bus controller.

The device driver 408 then determines (step 545) if the peripheral device 32 completes the transaction that requires the IOVA addresses. In one embodiment, the device driver 408 polls the peripheral device 32 to determine if the peripheral device 32 is in an available state. Upon such a determination, the device driver 408 invokes (step 550) a HAL function 416 (e.g., HalFreeIOVARange) to "free" the IOVA range that the device driver 408 previously mapped in step 440. In one embodiment, the device driver 408 invokes a HAL function 416 to "free" the IOVA range once for each range of IOVA addresses that were previously mapped. In more detail, the HAL function 416 decrements a reference count for that IOVA map in the S/G table 35 and unassigns each address previously mapped. In another embodiment, a HAL function 416 unassigns the entire range of IOVA addresses previously mapped from a single execution. Furthermore, the HAL 412 invalidates the appropriate S/G table 35 entries and clears the appropriate IOVA cache memory 41 entries for the I/O board 12.

In one embodiment, the HAL 412 efficiently manages the IOVA cache memory 41 by verifying that all of the S/G table 35 entries (e.g., pointers to the physical addresses) have been used prior to invalidating an entry in the IOVA cache memory 41. In other embodiments, the HAL 412 invalidates the IOVA cache entries upon the completion of each transaction in step 545.

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustration.

APPENDIX

| HAL Functions: | Purpose | Input Parameters: | Return Value: |
| --- | --- | --- | --- |
| HALGetSlotStatus | Read state of bus slot. States include: 1) Online-connected, able to function as bus master 2) Offline-connected, target-only, slot shot if it functions as bus master 3) Broken-electrically isolated and powered off 4) Removed-peripheral device removed from bus slot, unpowered, or damaged, and the slot is in the Broken state | PCIBusNumber, PCISlotNumber, AdditionalSlotData | Online, Offline, Broken, Removed, Invalid_Parameter, No I/O Board, I/O Board Offline, I/O Board Online, Status Bits |
| HALSetSlotStatus | Attempts to set the bus slot to one of the states listed above. | PCIBusNumber, PCISlotNumber RequestedSlotState | Success, Invalid_Parameter, Invalid_Request, No I/O Board |
| HALEnableIOVA | Enables IOVA protection for a peripheral device. | PCIBusNumber, PCISlotNumber | Success, Invalid_Parameter, Invalid_Request, IOVA_Error, No I/O Board |
| HALDisableIOVA | Disables IOVA protection for a peripheral device and unassigns the IOVA address used by the device. If the IOVA addresses used by the device are not unassigned, the function returns an IOVA Leak error. | PCIBusNumber, PCISlotNumber | Success, Invalid_Parameter, Invalid_Request, IOVA_Leak, IOVA_Error, No I/O Board |
| HALMapCommonBuffer | Maps a range of contiguous physical memory. | PCIBusNumber, PCISlotNumber, Buffer Length, Physical Memory Address, Physical IOVA Address | Null if memory cannot be mapped; Mapped address if memory can be mapped |
| HALUnmapCommonBuffer | Unassigns the range of IOVA addresses that was mapped for a peripheral device. | PCIBusNumber, PCISlotNumber, Buffer Length, IOVA Address | Success, Invalid_Parameter, Invalid_Request, No I/O Board |

APPENDIX-continued

| HAL Functions: | Purpose | Input Parameters: | Return Value: |
|---|---|---|---|
| HALAllocateIOVARange | Attempts to reserve the requested amount of IOVA memory space. | PCIBusNumber, PCISlotNumber, IOVASizeInBytes | Success, IOVA unavailable, or Amount of IOVA available |
| HALMapIOVARange | Maps a range of IOVA addresses, programs and enables the S/G table for a portion of the IOVA allotment that was reserved by HALAllocateIOVARange. | Memory map of IOVA, Physical address to map, Length of memory region to be mapped, Read/Write Boolean-TRUE to map the range as read-only, FALSE to map the range as read/write. | A logical IOVA address for the current transaction, or zero if an error occurs |
| HALFreeIOVARange | Unassigns range of IOVA addresses. | PCIBusNumber, PCISlotNumber, IOVA Address, Boolean to determine whether to free all or one of the mapped IOVA ranges | |

What is claimed is:

1. In a computer system that implements input/output virtual address translation and validation, a method for enabling input/output virtual address translation and validation comprising the steps of:
   (a) assigning a range of memory to a device driver for its exclusive use, the device driver associated with a peripheral device; and
   (b) invoking, by the device driver an operating system function to enable the computer system to receive a logical address and output a physical address, the physical address having a length greater than the logical address,
   wherein the function is not specific to the peripheral device, and
   wherein the function is a hardware abstraction layer function.

2. The method of claim 1 further comprising the step of assigning, by the device driver, a bus slot number to the peripheral device.

3. The method of claim 1 further comprising the step of initializing the computer.

4. The method of claim 3 further comprising the step of disabling input/output virtual address translation.

5. The method of claim 3 further comprising the step of assigning a range of memory to at least one attached peripheral device.

6. The method of claim 5 wherein the assigning further comprises the step of assigning a range of memory that is not physically contiguous to any other range of memory.

7. The method of claim 3 further comprising the step of reading at least one parameter from memory.

8. The method of claim 7 further comprising the step of allocating memory for at least one scatter-gather table based on the at least one parameter.

9. The method of claim 8 wherein the allocation is only performed if the at least one parameter is at least one of a set of predetermined valid table sizes.

10. The method of claim 8 wherein the at least one parameter further comprises a default table size.

11. The method of claim 8 further comprising the step of allocating memory for at least one input/output virtual address cache register and at least one enable register, both associated with the peripheral device.

12. The method of claim 3 further comprising the step of checking for valid peripheral device to peripheral device bridges.

13. The method of claim 3 further comprising the step of logging errors.

14. The method of claim 1 wherein step (b) comprises the step:
   (b-a) if this is the first time the device driver is invoking the functionality, then enabling input/output virtual address translation and verification.

15. The method of claim 1 further comprising the step of mapping an address range in response to a driver request.

16. The method of claim 1 further comprising the step of freeing an address range in response to a driver request.

17. The method of claim 1 further comprising the step of invoking, by the device driver, system functionality to change a scatter-gather table.

18. The method of claim 17 further comprising the step of entering an address-range mapping into the scatter-gather table.

19. The method of claim 18 further comprising the step of returning the mapping to the peripheral device to use for memory transactions.

20. The method of claim 19 further comprising determining that a transaction is complete.

21. The method of claim 19 further comprising invalidating an entry in the scatter-gather table.

22. The method of claim 19 further comprising clearing an entry in an input-output virtual address cache.

23. The method of claim 1 further comprising the step of invoking the system functionality by the device driver to disable the input/output virtual address translation and validation.

24. The method of claim 23 further comprising the step of invalidating the appropriate entries in memory when no devices are using input/output virtual address translation and verification.

25. The method of claim 23 further comprising decrementing a counter until no devices are using input/output virtual address translation.

* * * * *